United States Patent Office.

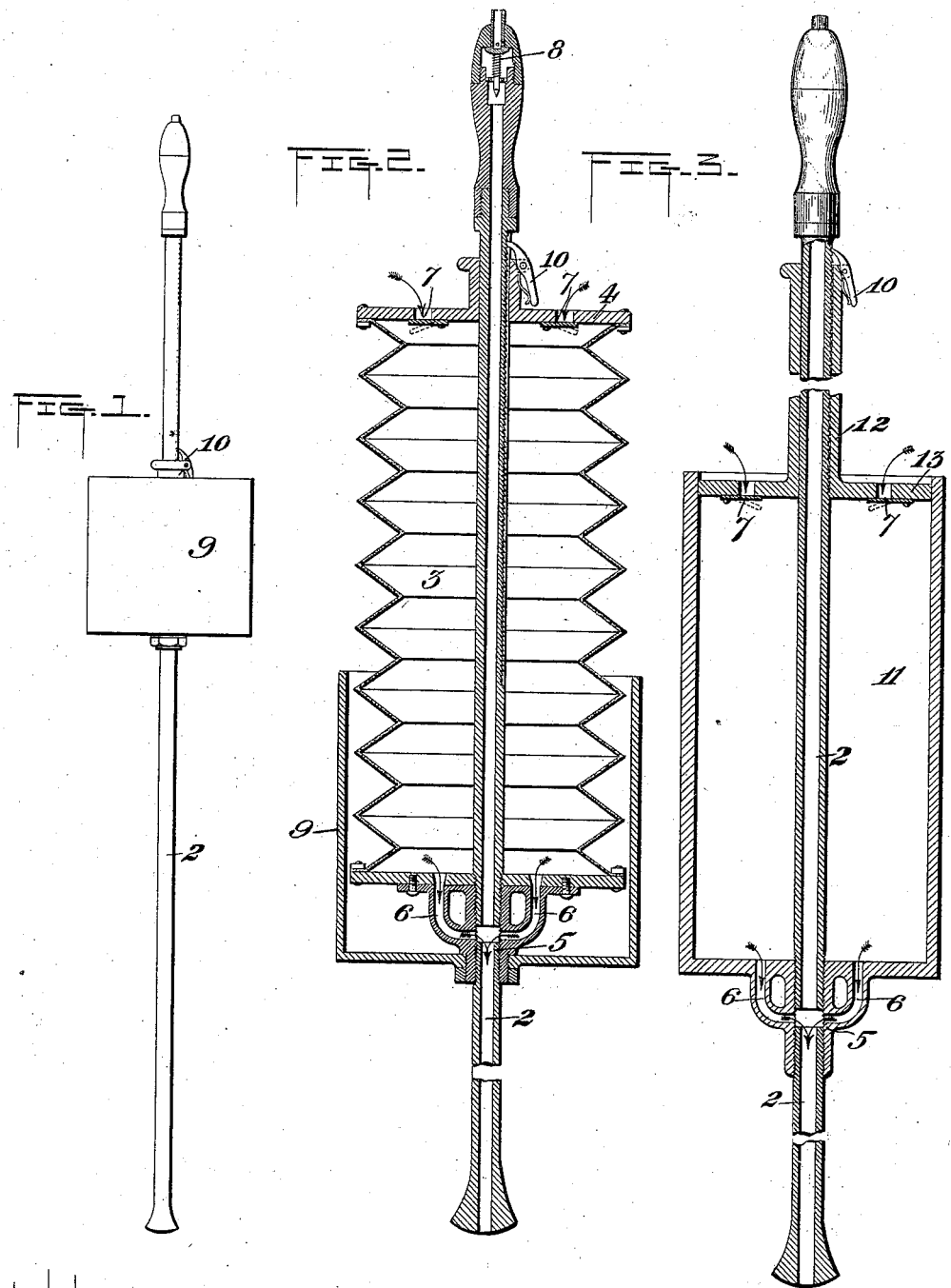

WILLIAM M. PIPER, OF ALLEGHENY CITY, PENNSYLVANIA, ASSIGNOR OF TWO-THIRDS TO STEPHEN NEWBERN AND CHARLES W. WOLFENDALE, OF SAME PLACE.

GLASS-BLOWING APPARATUS.

SPECIFICATION forming part of Letters Patent No. 381,887, dated April 24, 1888.

Application filed December 6, 1887. Serial No. 257,106. (No model.)

*To all whom it may concern:*

Be it known that I, WILLIAM M. PIPER, of Allegheny City, in the county of Allegheny and State of Pennsylvania, have invented a new and useful Improvement in Glass-Blowing Apparatus; and I do hereby declare the following to be a full, clear, and exact description thereof, reference being had to the accompanying drawings, in which—

Figure 1 is a side view of my improved glass-blowing apparatus when closed. Fig. 2 is a vertical longitudinal section thereof on a larger scale, showing the blower open. Fig. 3 is a similar view showing a modification.

Like symbols of reference indicate like parts in each.

My invention relates to an improvement in devices for blowing glassware, the object being to provide means for the substitution of mechanical devices for the blowing of glassware and window-glass, instead of blowing it by the lungs of the workmen in the manner heretofore practiced. The advantages of the substitution of such mechanical means will be apparent to those skilled in the art. The work of blowing glassware is very hard on the men, shortening their lives, and it also entails additional cost in the manufacture. Many attempts have been made to provide suitable appliances for this purpose, but hitherto they have been unsuccessful. These prior devices generally operate upon the principle of connecting a blow-pipe with a reservoir containing compressed air; but the difficulty in mechanism of this kind is that it does not leave the apparatus free to be swung back and forth by the workman, as is necessary in glass-blowing, and the apparatus is otherwise unwieldy and of little use. In another class of prior devices there has been a blow-pipe, at the upper end of which is a cylinder containing an air-piston, by means of which the compressed air is pumped down through the pipe for the purpose of blowing out the plastic glass. This, however, is disadvantageous, because it is inconvenient to be handled by the workmen, the apparatus not being of constant length.

The object of my invention is to overcome these difficulties and to provide an apparatus which will be efficient for the purpose for which it is intended.

Referring now to the drawings, 2 represents a tube or blow-pipe, at the lower end of which the glass is gathered. At a suitable point on the pipe, preferably about midway, there is a bellows, 3, consisting of a number of sections made circular in cross section, and fitting around the blow-pipe so as to be capable of being expanded and contracted longitudinally thereon, as will be readily understood. The lower or bottom plate of the bellows is fixed, and the upper plate, 4, moves loosely upon the blow-pipe. On the pipe 2 is a hollow socket-piece, 5, practically forming part of the blow-pipe, and from this socket project tubes 6, which lead from the socket up into the bellows 3, so that any air compressed by the bellows will flow down through the tubes 6 and into the blow-pipe. In the top plate of the bellows 3 is an air-valve, 7, through which air is admitted into the bellows.

Thus constructed, the operation of the device is as follows: The workman gathers glass at the end of the tube 2 in the usual way, and then in order to blow the glass he presses down upon the top plate of the bellows 4. This forces air down through the pipe 2 into the glass and expands it in a very natural manner. The upper end of the pipe 2 may be made with a mouth piece having a valve, 8, which may be operated by the tongue of the workman, so that if desired the workman may blow into the pipe 2, and thus form the article, or he may aid the action of the bellows by blowing into the tube. As before stated, the operation of the bellows in blowing the glass is very natural, and can be controlled with great accuracy by the workman. It also possesses the advantage that it does not at all interfere with the workman's manipulation of the blow-pipe in forming the glass article. The principal reason for this is that in working the bellows the operative length of the tube 2 does not change, as in prior devices, so that the workman may manipulate the bellows with one hand and have the other free to swing the tube. I desire to claim, broadly, in this application the combination of the bellows and the tube constructed in the manner described; but as an useful adjunct thereto, which I desire to claim separately, I provide the apparatus with means for protecting the bellows against the action of heat. This consists of a sheath or casing, 9, of asbestus, which fits around the tube 2 below the bellows and extends up part way around the bellows. The bellows thus work up and down within the casing, which protects the material of the bellows from the action of the heat, which might otherwise injure it.

Another useful adjunct of my invention is the use on the top plate of the bellows of a pawl, 10, which is adapted to engage ratchet-teeth on the blow-pipe. By means of this the bellows when compressed may be locked in any desired position.

In Fig. 3 I show a modified form of my invention, which consists in the use, instead of a bellows, 3, of a cylinder, 11, the upper end plate, 13, of which is fitted loosely around the blow-pipe by means of a tubular sheath or collar, 12, so as to be capable of movement up and down within the cylinder. Obviously, the principle of both these forms of my invention is the same, because in neither is the length of the tube varied by the operation of the air-compressing mechanism.

Without limiting myself to the precise form and dimensions of the parts which I show and describe, I claim as my invention—

1. As an apparatus for blowing glassware, a tube having mounted thereon a compressible air-blowing device, which moves up and down on the tube and is connected therewith, so that air compressed thereby shall flow into the tube to expand the article of glassware, said tube being of constant length from its mouth-piece to the end on which the glass is gathered, substantially as and for the purposes described.

2. In an apparatus for blowing glass, the combination, with a blowing-tube, of a flexible air-compressing device, 3, and a heat-protecting casing composed of insulating material, such as asbestus, substantially as and for the purposes described.

3. As an apparatus for blowing glassware, a tube having mounted thereon a compressible air-blowing device, which moves up and down on the tube and is connected therewith, so that air compressed thereby shall flow into the tube to expand the article of glassware, said tube being of constant length from its mouth-piece to the end on which the glass is gathered, and a pawl and ratchet, whereby the bellows may be confined, substantially as and for the purposes described.

In testimony whereof I have hereunto set my hand this 19th day of November, A. D. 1887.

WILLIAM M. PIPER.

Witnesses:
W. B. CORWIN,
THOMAS W. BAKEWELL.